(12) United States Patent
Gu et al.

(10) Patent No.: US 11,919,805 B2
(45) Date of Patent: Mar. 5, 2024

(54) CARBON-DOPED SILICON DIOXIDE GLASS AND METHODS OF MANUFACTURING THEREOF

(71) Applicant: Corning Incorporated, Corning, NY (US)

(72) Inventors: Yunfeng Gu, Painted Post, NY (US); Nicolas LeBlond, Painted Post, NY (US); Ming-Jun Li, Horseheads, NY (US); Jeffery Scott Stone, Addison, NY (US); Haitao Zhang, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 607 days.

(21) Appl. No.: 15/734,078

(22) PCT Filed: May 31, 2019

(86) PCT No.: PCT/US2019/034948
§ 371 (c)(1),
(2) Date: Dec. 1, 2020

(87) PCT Pub. No.: WO2019/232402
PCT Pub. Date: Dec. 5, 2019

(65) Prior Publication Data
US 2021/0214267 A1    Jul. 15, 2021

Related U.S. Application Data

(60) Provisional application No. 62/679,209, filed on Jun. 1, 2018.

(51) Int. Cl.
*C03C 3/06* (2006.01)
*C03C 23/00* (2006.01)

(52) U.S. Cl.
CPC .............. *C03C 3/06* (2013.01); *C03C 23/007* (2013.01); *C03C 2201/26* (2013.01)

(58) Field of Classification Search
CPC ..... C03C 23/0095; C03C 3/06; C03C 23/007; C03C 2201/26
See application file for complete search history.

(56) References Cited

U.S. PATENT DOCUMENTS 5,047,076 A * 9/1991 Cognolato ........ C03B 37/01838
65/901
5,151,117 A * 9/1992 Bartholomew ..... C03C 23/0095
65/427

(Continued)

FOREIGN PATENT DOCUMENTS

DE    102011121153 B3 *  3/2013  ........... C03B 37/014
DE    102011121153 B3     3/2013

OTHER PUBLICATIONS

Ghosh et al. Radiation Response Behavior of Carbon Co-Doped Aluminosilicate Glass Based Optical Fibre for Use as Radiation Sensor. Sensor Letters, vol. 11, 1408-1414, 2013.*
Feng et al; "Raman Scattering Studies of Chemical-Vapor-Deposited Cubic SiC Films Of (100) Si"; Journal of Applied Physics, 64 (1988) 3176.

(Continued)

*Primary Examiner* — Karl E Group

(57) ABSTRACT

A silica-based substrate includes a glass phase and a dispersed phase having carbon, such that the silica-based substrate has a thickness of at least 10 gm. Also disclosed is a method of forming a silica-based substrate, the method including contacting a porous silica soot preform with an organic solution having at least one hydrocarbon precursor to form a doped silica soot preform and heating the doped silica soot preform in an inert atmosphere to form the silica-based substrate.

20 Claims, 6 Drawing Sheets

(56) References Cited

U.S. PATENT DOCUMENTS

| | | | |
|---|---|---|---|
| 5,266,533 | A | 11/1993 | Leung et al. |
| 6,578,387 | B2 * | 6/2003 | Tankala ............ C03B 37/01838 65/390 |
| 6,602,779 | B1 | 8/2003 | Li et al. |
| 6,762,435 | B2 | 7/2004 | Towle |
| 6,797,643 | B2 | 9/2004 | Zhao et al. |
| 7,930,904 | B2 | 4/2011 | Bookbinder et al. |
| 2003/0024275 | A1 * | 2/2003 | Tankala ............ C03B 37/01838 65/390 |

OTHER PUBLICATIONS

Ferrari et al; "Stress Reduction and Bond Stability During Thermal Annealing of Tetrahedral Amorphous Carbon"; Journal of Applied Physics; 85 (1999), 7191.

Hayashi et al; "Photoluminescence Spectra of Carbon Clusters Embedded in SiO2"; Jpn. J. Appl. Phys., 32 (1993) L274.

International Search Report and Written Opinion of the International Searching Authority; PCT/US19/034948; dated Oct. 18, 2019; 9 Pages; European Patent Office.

Ishikawa et al; "Color Control of White Photoluminescence From Carbon-Incorporated Silicon Oxide"; Journal of Applied Physics, 104 (2008) 083522.

Ning et al., "Fabrication and mechanical properties of SiO2 matrix composites reinforced by carbon nanotube", vol. 3557, Materials Science and Engineering: A, 2003, pp. 392-396.

Olego et al; "Pressure Dependence of Raman Phonons of Ge and 3C-SiC"; Physical Review B, vol. 25, No. 2; (1982) 1151-1160.

Seo et al; "Intense Blue-White Luminescence From Carbon-Doped Silicon-Rich Silicon Oxide"; Appl. Phys. Lett. 84 (2004) 717.

Vasin et al; "Strong White Photoluminescence From Carbon-Incorporated Silicon Oxide Fabricated by Preferential Oxidation of Silicon in Nano-Structured Si:C Layer"; Jpn. J. Appl. Phys. 46, (2007) L465.

Yu et al; "Visible Photoluminescence in Carbon-Implanted Thermal SiO2 Films"; Phys. Stat. Sol. (A) (1998) 168, 531.

Zhao et al; "Different Liminescent Properties of C+-Implanted SiO2 Films Grown by Thermal Oxidation and PECVD"; Materials Letters 38 (1999) 321-325.

Zhao et al; Intense Short-Wavelength Photoluminescence From Thermal SiO2 Films Co-Implanted With Si and C Ions; Appl. Phys. Lett. 73 (1998) 1838.

* cited by examiner

CARBON-DOPED SILICON DIOXIDE GLASS AND METHODS OF MANUFACTURING THEREOF

CROSS-REFERENCE TO RELATED APPLICATIONS

This application is a National Stage application under 35 U.S.C. § 371 of International Application No. PCT/US2019/034948, filed on May 31, 2019, which claims the benefit of priority of U.S. Provisional Application Ser. No. 62/679,209 filed on Jun. 1, 2018 the contents of both of which are relied upon and incorporated herein by reference in their entirety as if fully set forth below.

BACKGROUND

1. Field

This disclosure relates to carbon-doped silicon dioxide glass and methods of manufacturing thereof.

2. Technical Background

Carbon-doped silicon dioxide ($SiO_2$) produces novel materials with unique optical and electronic properties. Besides the production of "black" glass with high optical absorption, carbon-doped $SiO_2$ exhibits improved electrical conductivity, chemical stability, and is a promising method to generate broad-band white light emission. Conventional technologies do not provide effective means for incorporating carbon in bulk $SiO_2$ materials, but rather, being limited to carbon-doped $SiO_2$ thin films using techniques such as chemical vapor deposition (CVD), ion implantation, magnetron sputtering, and carbonization/oxidation of porous silicon. Doping bulk-fused $SiO_2$ glass with carbon, however, remains a challenge due to the difficulty of controlling carbon dopants dispersion in $SiO_2$ or the reaction between carbon and $SiO_2$ during the consolidation of $SiO_2$ at high temperatures (e.g., greater than 1400° C.).

The present application discloses improved carbon-doped silicon dioxide glass and methods of manufacturing thereof for incorporating carbon in bulk $SiO_2$ materials.

SUMMARY

In some embodiments, a silica-based substrate comprises a glass phase; a dispersed phase comprising carbon, wherein the silica-based substrate has a thickness of at least 10 µm.

In one aspect, which is combinable with any of the other aspects or embodiments, the carbon is at least one of: graphite carbon, silicon carbide, and amorphous carbon.

In one aspect, which is combinable with any of the other aspects or embodiments, the substrate comprises a carbon concentration in a range of 0.0001 wt. % (i.e., 1 ppm) to 1 wt. %.

In one aspect, which is combinable with any of the other aspects or embodiments, the carbon concentration in a range of 0.0001 wt. % (i.e., 1 ppm) to 0.25 wt. %.

In one aspect, which is combinable with any of the other aspects or embodiments, the dispersed phase comprises a first region having a first density and a second region having a second density, the first density being different from the second density.

In one aspect, which is combinable with any of the other aspects or embodiments, the dispersed phase comprises a first region having a first density and a second region having a second density, the first density being the same as the second density.

In one aspect, which is combinable with any of the other aspects or embodiments, the glass phase comprises a glassy domain having a carbon concentration of less than 0.01 wt. %.

In one aspect, which is combinable with any of the other aspects or embodiments, the glass phase comprises a glassy domain having a carbon concentration that is lower than the solubility of carbon in $SiO_2$.

In one aspect, which is combinable with any of the other aspects or embodiments, the carbon is positioned at a boundary of the glassy domain.

In one aspect, which is combinable with any of the other aspects or embodiments, the carbon is dispersed as a connected network to outline boundaries of the glassy domain.

In one aspect, which is combinable with any of the other aspects or embodiments, the carbon is dispersed as a disconnected network to outline boundaries of the glassy domain.

In one aspect, which is combinable with any of the other aspects or embodiments, the carbon is a nanostructure comprising at least one of nanoparticles, nanorods, nanowires, nanocylinders, or nanoribbons.

In one aspect, which is combinable with any of the other aspects or embodiments, the nanostructure has at least one dimension in a range of 20 nm to 200 nm.

In one aspect, which is combinable with any of the other aspects or embodiments, the nanostructure has at least one dimension in a range of 100 nm to 200 nm.

In one aspect, which is combinable with any of the other aspects or embodiments, the nanostructure has an aspect ratio in a range of 2 to 500.

In one aspect, which is combinable with any of the other aspects or embodiments, the nanostructure has an aspect ratio in a range of 5 to 100.

In one aspect, which is combinable with any of the other aspects or embodiments, the carbon is continuously dispersed in the glass phase.

In one aspect, which is combinable with any of the other aspects or embodiments, the carbon is not continuously dispersed in the glass phase.

In one aspect, which is combinable with any of the other aspects or embodiments, the carbon is uniformly distributed in the glass phase.

In one aspect, which is combinable with any of the other aspects or embodiments, the electrical resistivity is in a range of 3000 Ω·cm to 5000 Ω·cm.

In some embodiments, which is combinable with any of the other aspects or embodiments, an optical fiber, optical attenuator, fiber laser, or sensor comprises a substrate disclosed herein.

In some embodiments, a method of forming a silica-based substrate comprises contacting a porous silica soot preform with an organic solution comprising at least one hydrocarbon precursor to form a doped silica soot preform; heating the doped silica soot preform in an inert atmosphere to form the silica-based substrate.

In one aspect, which is combinable with any of the other aspects or embodiments, the porous silica soot preform has a porosity in a range of 25% to 75% and pore sizes in a range of 100 nm to 500 nm.

In one aspect, which is combinable with any of the other aspects or embodiments, the porosity is in a range of 55% to 65% and pore sizes in a range of 100 nm to 300 nm.

In one aspect, which is combinable with any of the other aspects or embodiments, the hydrocarbon precursor comprises at least one of (a) alkanes of the form $C_nH_{2n+2}$; (b) alkenes of the form $C_nH_{2n}$; (c) carboxylic acids, amines, or alcohols with an aliphatic group of at least 6 carbon atoms; (d) metal carboxylates; (e) graphite powder; amorphous carbon powder; paraffin wax; or phenolic resin; or (f) organic polymers; wherein n>6.

In one aspect, which is combinable with any of the other aspects or embodiments, the hydrocarbon precursor comprises at least one of: icosane, octadecane, heptadecane, 1-octadecene, stearic acid, oleic acid, myristic acid, octanoic acid, oleylamine, trioctylamine, octadecenol, zinc stearate, zinc oleate, zinc acetate, polystyrene, or polyethylene.

In one aspect, which is combinable with any of the other aspects or embodiments, the organic solution comprises at least one of: hexane, heptane, toluene, benzene, acetone, methanol, ethanol, butanol, chloroform, dichloromethane, or water.

In one aspect, which is combinable with any of the other aspects or embodiments, the organic solution comprises at least one of zinc stearate and toluene or stearic acid and hexane.

In one aspect, which is combinable with any of the other aspects or embodiments, the step of contacting is conducted at or above a boiling point temperature of the organic solution.

In one aspect, which is combinable with any of the other aspects or embodiments, after the step of contacting, cooling the doped silica soot preform; and drying the doped silica soot preform in air.

In one aspect, which is combinable with any of the other aspects or embodiments, the organic solution has a concentration of the at least one hydrocarbon precursor in a range of 1 mg/mL to 100 mg/mL.

In one aspect, which is combinable with any of the other aspects or embodiments, the step of heating is conducted at a temperature in a range of 1000° C. to 2000° C. and for a time in a range of 0.1 hr to 10 hrs.

In one aspect, which is combinable with any of the other aspects or embodiments, the step of heating comprises decomposing the at least one hydrocarbon precursor into an amorphous carbon; and densifying the doped silica soot preform to form the silica-based substrate.

In one aspect, which is combinable with any of the other aspects or embodiments, the temperature is in a range of 1300° C. to 1500° C. the time is in a range of 1 hr to 3 hrs.

In one aspect, which is combinable with any of the other aspects or embodiments, the silica-based substrate has at least one length dimension less than a length dimension of the silica soot preform.

BRIEF DESCRIPTION OF THE DRAWINGS

The disclosure will become more fully understood from the following detailed description, taken in conjunction with the accompanying figures, in which.

DETAILED DESCRIPTION

Figure 1:
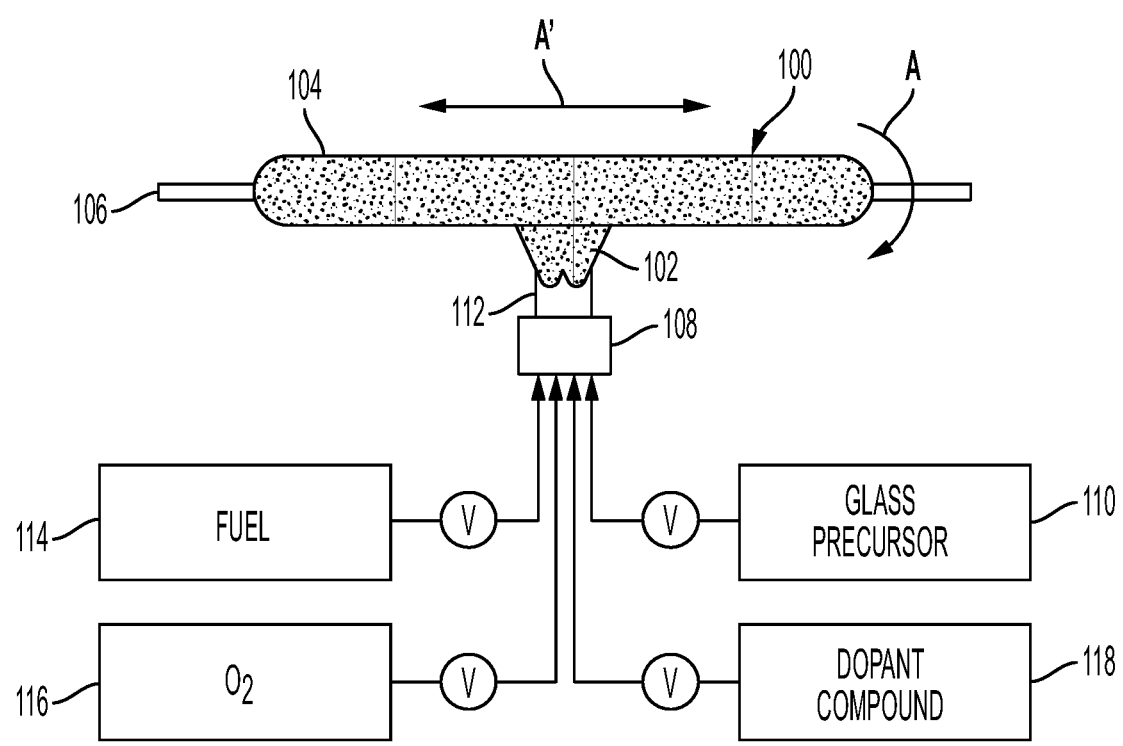
FIG. 1 illustrates an OVD method for forming a soot preform, according to some embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting. Additionally, any examples set forth in this specification are not limiting and merely set forth some of the many possible embodiments of the claimed invention.

"Preform" refers to the porous solid product formed from vapor deposition of oxide soot and optional drying. "Blank" refers to the solid product formed from sintering or thermally consolidating a preform. "Dope," "dopant," and like terms refer to the addition of a conductive substance such as at least one carbon form from any suitable carbon precursor, to the pores or the interstitial surfaces of the pores of a porous glass preform or like article, for the purpose of lowering the resistivity and increasing the conductivity of the resulting carbon doped glass. "Bulk" refers to porous silica soot preforms, doped silica soot preforms, silica-based substrates, or other like $SiO_2$ or carbon-doped $SiO_2$ materials having a thickness of at least 10 μm.

The present disclosure provides improved carbon-doped silicon dioxide glass and methods of manufacturing thereof for incorporating carbon in bulk $SiO_2$ materials. For example, in some embodiments, a carbon-doped $SiO_2$ glass exhibits an electrical resistivity in a range of 3000 Ω·cm to 5000 Ω·cm, which is about 15 orders of magnitude lower than that of pure fused silica (~$10^{18}$ Ω·cm).

In a first step of forming the carbon-doped silicon dioxide glass, a porous silica soot preform was placed in contact with an organic solution comprising at least one hydrocarbon precursor to form a doped silica soot preform. The preform used in the solution doping process may be an outside vapor deposition (OVD) silica soot blank or silica soot pellets prepared by pressing $SiO_2$ nanoparticles.

For OVD processes, silica and doped silica particles are pyrogenically generated in a flame and deposited as soot. Silica soot preforms are formed layer-by-layer by deposition of the particles on the outside of a cylindrical target rod by traversing the soot-laden flame along the axis of the cylindrical target.

FIG. 1 illustrates an OVD method for forming a soot preform 100, according to some embodiments. A soot preform 100 is formed by depositing silica-containing soot 102 onto an outside of a rotating and translating mandrel or bait rod 106. Mandrel 106 is preferably tapered. Soot 102 is formed by providing glass precursor 110 in gaseous form to flame 112 of a burner 108 to oxidize it. Fuel 114 (e.g., methane ($CH_4$)) and combustion supporting gas 116 (e.g., oxygen ($O_2$)) are provided to burner 108 and ignited to form flame 112. Optional dopant compounds 118 (e.g., germanium (Ge), fluorine (F), etc.) may be included, if desired. Mass flow controllers (V) meter the dopant compound 118, silica glass precursor 110, fuel 114, and combustion supporting gas 116, to the burner 108. The dopant compound 118 and silica glass precursor 110 are oxidized in flame 112 to form a generally cylindrically-shaped soot region 104.

Porosity of the OVD soot blanks may be controlled by varying $CH_4/O_2$ flows in the deposition burners. Increasing the $CH_4/O_2$ flows to the burners will result in a decrease in the porosity of the soot preform, while decreasing the $CH_4/O_2$ flows will result in a corresponding increase in the soot porosity. Porosity may also be modified by varying the speed at which the preform traverses through the deposition flame. In some embodiments, the porosity of the OVD soot blanks is in a range of 30% to 90%. In some embodiments, the porosity of the OVD soot blanks is in a range of 50% to 70%.

In some embodiments, the process for preparing an OVD soot blank is described in U.S. Pat. No. 7,930,904, the entirety of which is herein incorporated by reference.

For silica soot pellets prepared by pressing $SiO_2$ nanoparticles, silica soot particles are compressed in a mold by a perpendicular or radial direction of pressure and then heat treated (up to 1200° C.) to enhance soot body strength. The compressed silica soot pellets have an average particle size distribution in a range of 0.01 µm to 1.0 µm. In some embodiments, the average particle size distribution is in a range of 0.02 µm to 0.5 µm. In some embodiments, the average particle size distribution is in a range of 0.05 µm to 0.4 µm (e.g., 0.2 µm). Porosity of the compressed silica soot pellets may be controlled by varying silica soot particle size, doping silica nanoparticles, or altering compression pressure. In some embodiments, the porosity of the compressed silica soot pellets is in a range of 30% to 90%. In some embodiments, the porosity of the compressed silica soot pellets is in a range of 50% to 80%. In some embodiments, the porosity of the compressed silica soot pellets is in a range of 55% to 70%. In some embodiments, the compressed silica soot pellet has an average pore size in a range of 0.01 µm and 0.5 µm. In some embodiments, the compressed silica soot pellet has an average pore size in a range of 0.05 µm and 0.25 µm. In some embodiments, the compressed silica soot pellet has an average pore size in a range of 0.07 µm and 0.12 µm.

In some embodiments, the porous silica soot preform has a porosity in a range of 25% to 75% and pore sizes in a range of 100 nm to 500 nm. In some embodiments, the porous silica soot preform has a porosity in a range of 55% to 65% and pore sizes in a range of 100 nm to 300 nm.

After preparation of the porous silica soot preform (e.g., by OVD, compression, or similar techniques), the porous silica soot preform was placed in contact with an organic solution comprising at least one hydrocarbon precursor to form a doped silica soot preform. In some embodiments, the contacting step was conducted at or above a boiling point temperature of the organic solution.

The organic solution comprises at least one suitable hydrocarbon precursor capable of incorporation into porous silica soot preform. In some embodiments, appropriate hydrocarbon precursors include:
(a) alkanes of the form $C_nH_{2n+2}$;
(b) alkenes of the form $C_nH_{2n}$;
(c) carboxylic acids, amines, or alcohols with an aliphatic group of at least 6 carbon atoms;
(d) metal carboxylates;
(e) graphite powder; amorphous carbon powder; paraffin wax; or phenolic resin; or
(f) organic polymers;
wherein n>6.

For example, the organic solution may include high boiling point alkane and alkenes such as icosane, octadecane, heptadecane, 1-octadecene, or the like. Other examples of the at least one hydrocarbon precursor include stearic acid, oleic acid, myristic acid, octanoic acid, oleylamine, trioctylamine, octadecenol. Metal carboxylates hydrocarbon precursors may include at least one transition metal (e.g., titanium (Ti), vanadium (V), chromium (Cr), manganese (Mn), iron (Fe), cobalt (Co), nickel (Ni), copper (Cu), zinc (Zn), etc.), post-transition metal (e.g., aluminum (Al)), alkali metal, or alkaline earth metal. Organic polymers may include polystyrene, polyethylene, polypropylene, or the like.

Moreover, the organic solution may also include a solvent comprising at least one of hexane, heptane, toluene, benzene, acetone, methanol, ethanol, butanol, chloroform, dichloromethane, or water. In some embodiments, the organic solution comprises a zinc stearate hydrocarbon precursor and toluene. In some embodiments, the organic solution comprises a stearic acid hydrocarbon precursor and hexane. In some embodiments, the organic solution comprises a salt, ester, or other suitable derivatives of the hydrocarbon precursors disclosed herein (e.g., for stearic acid: an alkyl stearate ester).

Concentration of the hydrocarbon precursor in the organic solvent may be varied in a range of 1 mg/mL to 100 mg/mL. This concentration range was found to produce a uniform hydrocarbon dopant distribution inside the porous silica soot preform and avoids unwanted migration and pooling of the dopant at a surface of the porous silica soot preform during solvent evaporation. Factors involved in determining whether the hydrocarbon dopant is uniformly distributed in the porous silica soot preform include (1) solubility differences of the precursor at different temperatures in the organic solvent, and (2) chemical interaction of the precursor with the porous silica soot preform surface.

With respect to (1), in the instance where the organic solution comprises zinc stearate hydrocarbon precursor and toluene, for example, the solubility of zinc stearate in toluene is greater than 100 mg/mL at 110° C. (approximate boiling point of toluene) while less than 1 mg/mL at room temperature (e.g., 25° C.). Thus, there is a greater amount of hydrocarbon precursor available for entry into the porous silica soot preform at elevated temperatures. When the soak of the porous silica soot preform in the hot, concentrated organic solution is complete, the preform is quickly cooled down, thereby allowing the precursor to precipitate inside the preform, rather than diffusing to the preform surface during solvent evaporation. With respect to (2), strong interaction (i.e., Lewis acid-base interactions) of the hydrocarbon precursor (for example, the hydroxide (—OH) group when a stearic acid precursor is used or the $Zn^{2+}$ ion when a zinc stearate precursor is utilized) with the contacting surface of the porous silica soot preform prevents diffusion of the hydrocarbon precursor to the silica surface during solvent evaporation.

In some embodiments, the doped silica soot preform may be formed during preparation of the porous silica soot preform. For example, $SiO_2$ nanoparticles may be mechanically and uniformly mixed (e.g., mechanic mill, vortexing, ball milling, jetting, and like methods, or combinations thereof) with the hydrocarbon precursor and then pressed to form a doped silica soot preform pellet. In some examples, the mixing is a dry mixing process. In some examples, the mixing is a wet mixing process whereby silica nanoparticles are mixed with hydrocarbon precursor and an organic solvent. In some examples, silica nanoparticles are mixed with hydrocarbon precursor in solution and then precipitated out.

After the porous silica soot preform was contacted with an organic solution comprising at least one hydrocarbon precursor to form the doped silica soot preform, the doped silica soot preform was cooled and dried in air. As explained above, the cooling and drying steps serve to precipitate out the precursor inside the preform rather than diffusing to the preform surface during solvent evaporation.

Subsequently, the cooled and dried doped silica soot preform was consolidated by heating in an inert atmosphere to form the silica-based substrate. In some embodiments, the heating was conducted at a temperature in a range of 1000° C. to 2000° C. In some embodiments, the heating was conducted at a temperature in a range of 1200° C. to 1800° C. In some embodiments, the heating was conducted at a temperature in a range of 1300° C. to 1500° C. In some embodiments, the heating was conducted for a time in a range of 0.1 hr to 10 hrs. In some embodiments, the heating was conducted for a time in a range of 0.5 hr to 5 hrs. In some embodiments, the heating was conducted for a time in a range of 1 hr to 3 hrs. In some embodiments, the heating was conducted at a temperature in a range of 1300° C. to 1500° C. and for a time in a range of 1 hr to 3 hrs. To minimize loss of carbon precursors during the heating-up process, the heating ramp rate may be at least 5° C./minute or at least 10° C./minute.

After the doped silica soot preform was cooled and dried in air, the heating step resulted in decomposition of the uniformly distributed hydrocarbon precursor into an amorphous carbon, graphite carbon, silicon carbide, or combination thereof; and densified the doped silica soot preform to form the silica-based substrate such that the silica-based substrate has at least one length dimension less than a length dimension of the porous silica soot preform.

EXAMPLES

1. Process for Making Carbon-Doped $SiO_2$ Glass

Low-volatility bulky hydrocarbon compounds, such as zinc stearate and stearic acid, are used as hydrocarbon precursors dissolved in toluene and hexane, respectively, to dope OVD silica soot blanks (i.e., porous silica soot preform). The OVD silica soot blanks have a porosity in a range of 55% to 65% with pore sizes in a range of 100 nm to 300 nm. Furthermore, the test OVD silica soot blanks were cylindrically configured, having a diameter of about 1.5 inches and a length of about 1.0 inch.

In some implementations, the OVD silica soot blanks were soaked in a boiling zinc stearate/toluene solution at about 110° C. for a time in a range of 1 hrs to 10 hrs. In some implementations, the OVD silica soot blanks were soaked in a boiling stearic acid/hexane solution at about 68° C. for a time in a range of 1 hrs to 10 hrs. The doped OVD silica soot blank is then cooled to room temperature and dried in air for approximately 24-48 hours. The doping level was tuned by varying the concentration of the hydrocarbon precursor in their respective organic solvents. In some implementations, a concentration of 50 mg/mL of zinc stearate was used in 100 mL of solution. Carbon-doped $SiO_2$ glass was obtained by heating (i.e., consolidating) the hydrocarbon precursor-doped OVD silica soot blank in helium (He) or argon (Ar) or nitrogen ($N_2$) at 1500° C. for a time in a range of 1.5 hrs to 2.5 hrs.

In some embodiments, the carbon-doped $SiO_2$ glass has a carbon concentration in a range of 0.0001 wt. % (1 ppm) to 1 wt. %. In some embodiments, the carbon-doped $SiO_2$ glass has a carbon concentration in a range of 0.0001 wt. % (1 ppm) to 0.25 wt. %.

2. Characterization of Carbon-Doped $SiO_2$ Glass

A carbon-doped $SiO_2$ glass substrate was prepared according to the process described in Example 1. After consolidating, the carbon-doped $SiO_2$ glass substrate was a densified black glass measured as having a diameter of about 1.0 inches and a length of about 0.6 inch. LECO combustion elemental analysis determined a carbon dopant concentration as being about 0.28 wt. %.

Figure 2:
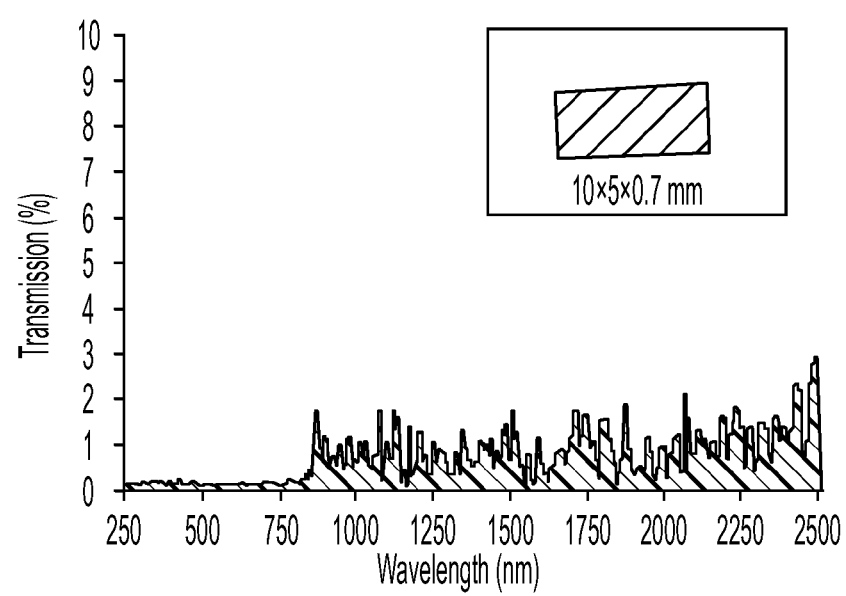
FIG. 2 is an optical transmission spectrum through polished, carbon-doped (0.28 wt. %) $SiO_2$ glass (0.7 mm thickness).

FIG. 2 is an optical transmission spectrum through polished, carbon-doped (0.28 wt. %) $SiO_2$ glass having a thickness of about 0.7 mm. The absorption of carbon dopants causes strong optical attenuation (of less than 2% transmission) in a wide wavelength range of 250 nm to 2500 nm. In other words, light having a wavelength in a range of 250 nm to 2500 nm has a transmission of less than 2% through black glass having a 0.28 wt. % carbon dopant concentration. Such black glass maintains its color after heat treatment in air at 900° C. for about 4 hours. The heat treatment at 900° C. was used to determine the thermal stability of the carbon-doped $SiO_2$ glass.

Figure 3:
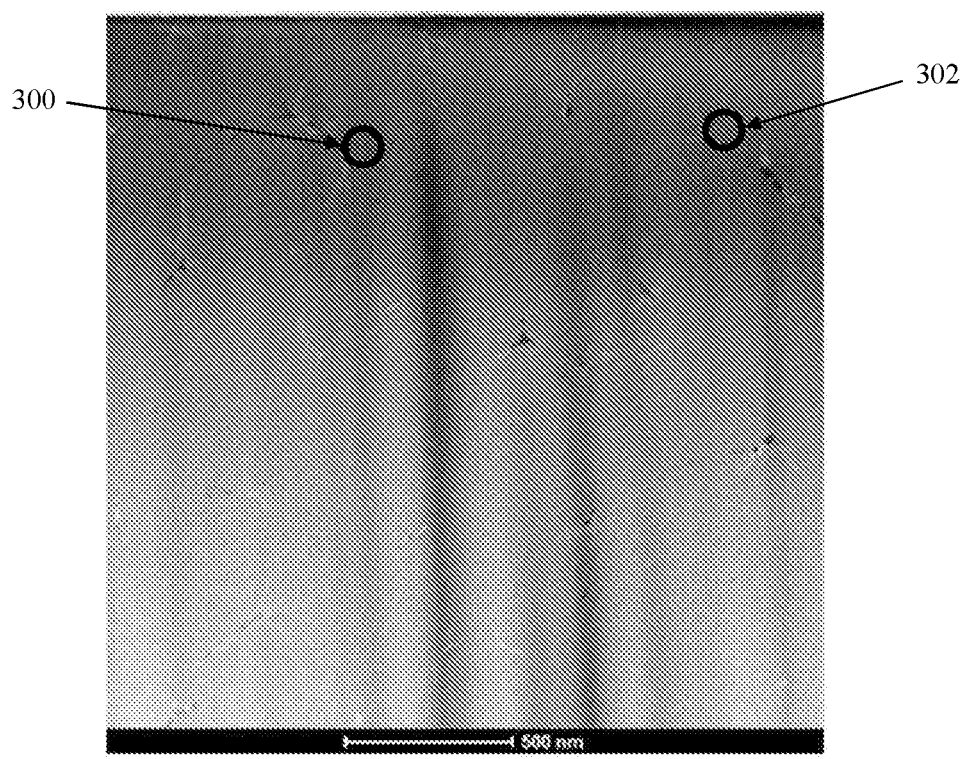
FIG. 3 is a transmission electron microscopy (TEM) image of a 0.28 wt. % carbon-doped $SiO_2$ cross-section sample.

FIG. 3 is a transmission electron microscopy (TEM) image of a 0.28 wt. % carbon-doped $SiO_2$ cross-section sample and suggests uniform carbon distributions of the carbon dopant shaped as rod-like nanostructures outlining glassy domain boundaries. In some implementations, the rod-like nanostructures have a length in a range of 20 nm to 200 nm. The rod-like nanostructures of FIG. 3 have a length in a range of 100 nm to 200 nm and a width of a few nm wide. In some implementations, the rod-like nanostructures have an aspect ratio in a range of 2 to 500. In some implementations, the rod-like nanostructures have an aspect ratio in a range of 5 to 100. In some implementations the nanostructures may be at least one of nanoparticles, nanorods, nanowires, nanocylinders, or nanoribbons.

Microstructural analysis by electron energy loss spectroscopy reveals that brighter regions of the rod-like nanostructures of FIG. 3 may contain silicon carbide, while darker regions of the rod-like nanostructures in FIG. 3 may contain amorphous carbon and graphite carbon.

Figure 6:
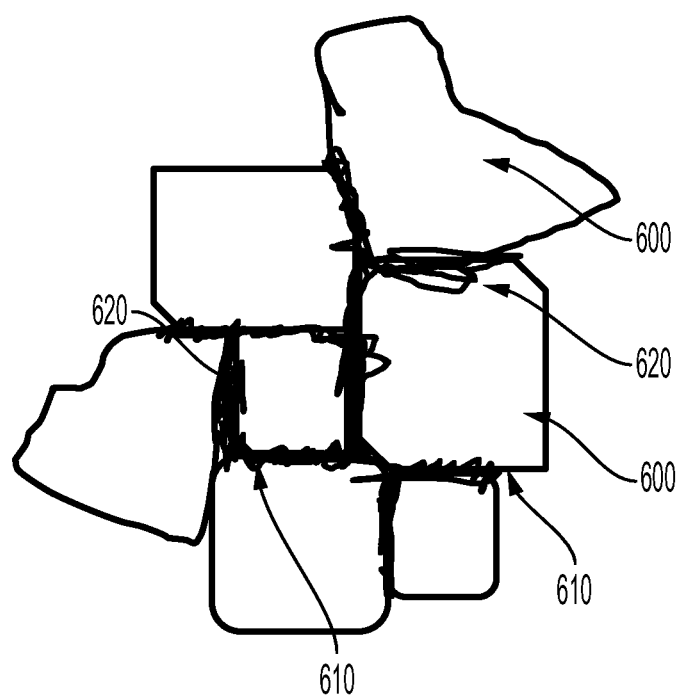
FIG. 6 is a schematic of a carbon-doped $SiO_2$ material according to one embodiment showing a continuous glass phase and a dispersed carbon phase distributed substantially at glass grain boundaries or the glass phase interface.

FIG. 6 illustrates a schematic of a carbon-doped $SiO_2$ material showing a continuous glass phase and a dispersed carbon phase distributed substantially at glass grain boundaries 610 (i.e., glass phase interface). Taking FIGS. 3 and 8 together, it is shown that the dispersed carbon phase 620 may form connected network to outline boundaries 610 of the glassy domain 600. In other words, the glass phase comprises a glassy domain 600 having a carbon concentration of less than 0.01 wt. % and a boundary 610 of the glassy domain 600 which does have carbon 620. In some embodiments, the dispersed carbon phase may form a disconnected network to outline boundaries of the glassy domain. The carbon may be continuously dispersed in the glass phase, or the carbon may not be continuously dispersed in the glass phase, or the carbon may be a combination of continuously and not continuously dispersed in the glass phase.

Moreover, FIG. 3 illustrates dark 300 and bright 302 features indicating that the dispersed carbon phase may comprise varying densities (brighter features indicate a higher density area). The higher density bright 302 features comprise silicon carbide, while the lower density dark 300 features comprise amorphous carbon and graphite carbon. Thus, in some implementations, the dispersed carbon phase comprises a first region having a first density and a second region having a second density, the first density being different from the second density. In some implementations, the dispersed carbon phase comprises a first region having a first density and a second region having a second density, the first density being the same as the second density.

Figure 4:
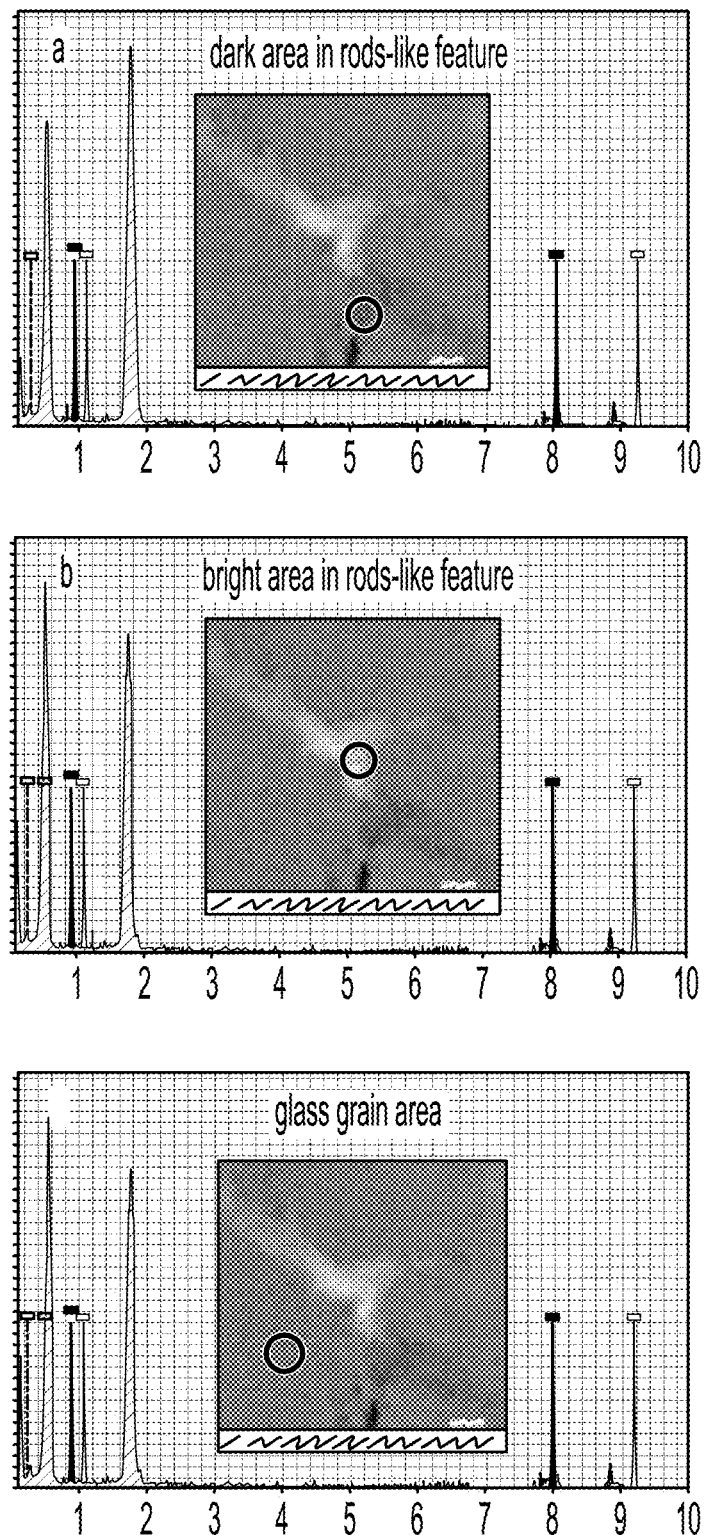
FIGS. 4(a) to 4(c) are energy dispersive spectroscopy (EDS) images of a 0.28 wt. % carbon-doped $SiO_2$ cross-section sample illustrating: dark areas of rod-like features (FIG. 4(a)), bright areas of rod-like features (FIG. 4(b)), and glassy domain (FIG. 4(c)). The EDS detect area is shown by the red circle.

FIGS. 4(*a*) to 4(*c*) are energy dispersive spectroscopy (EDS) images of a 0.28 wt. % carbon-doped $SiO_2$ cross-section sample illustrating: dark areas of rod-like features (FIG. 4(*a*)), bright areas of rod-like features (FIG. 4(*b*)), and glassy domain (FIG. 4(*c*)). The EDS detect area is shown by the circle. The Cu signal is from the TEM grids, and Ga signal is from TEM sample preparation with FEI Quanta 3D FEG 600 Focused Ion Beam. EDS analysis suggests the presence of carbon at both the dark area (i.e., 300 from FIG. 3) and bright area (i.e., 302 from FIG. 3) in these rod-like features, however, no carbon is detected from in the glassy domain (FIG. 4(*c*)). This indicates that carbon dopants are mostly distributed at boundaries of the glassy domain.

Figure 5:
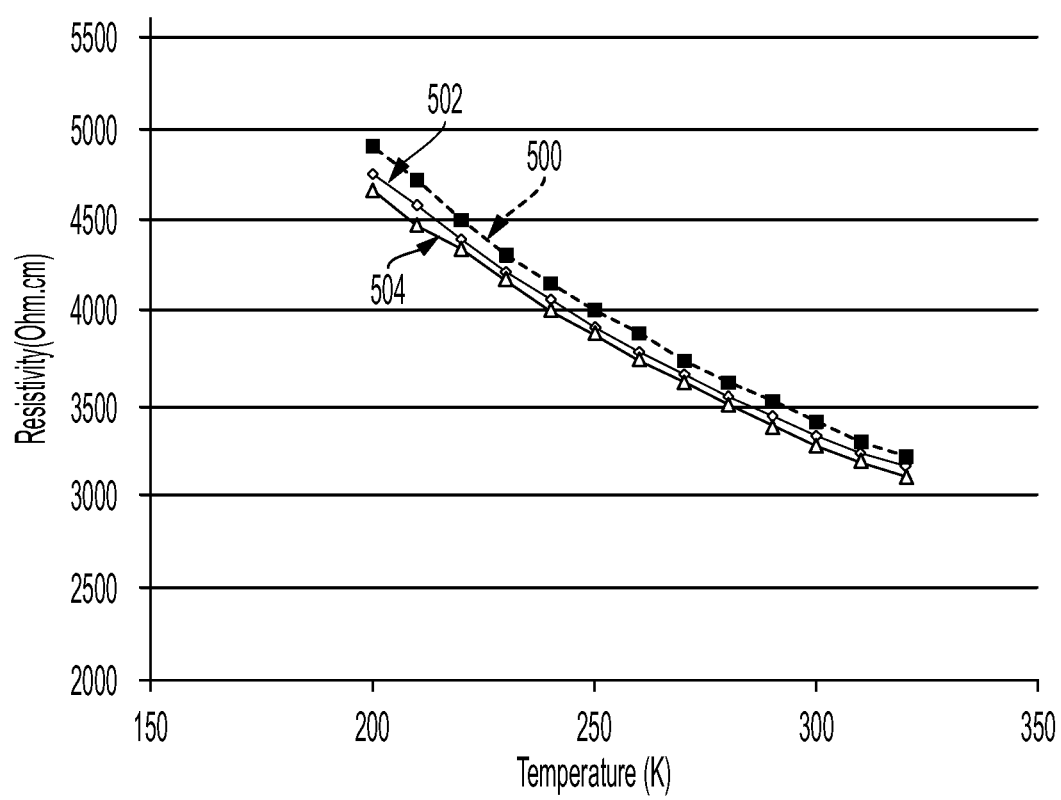
FIG. 5 illustrates electrical resistivity characterization of 0.28 wt. % carbon-doped $SiO_2$ including DC curves (500), AC curves (502), and I-V curves (504).

FIG. 5 illustrates electrical resistivity characterization of 0.28 wt. % carbon-doped $SiO_2$ including DC curves (500), AC curves (502), and I-V curves (504). Measurements are made in cryostat in vacuum. AC, DC, and I-V methods are used to evaluate consistency of the carbon-doped $SiO_2$ electrical behavior. The measured electrical resistivity of 3000 $\Omega \cdot cm$ to 5000 $\Omega \cdot cm$ (i.e., equaling a conductivity in a range of about 33 mS/m to 20 mS/m) is about 15 orders of magnitude lower than the resistivity of pure fused silica (about $10^{18}$ $\Omega \cdot m$). This indicates that carbon dopants form connected networks inside $SiO_2$ glass to enable electrical conduction (i.e., such a low electrical resistivity, comparatively), which is consistent with the carbon distribution studies of FIGS. 3 to 4(*c*).

Thus, as provided herein, carbon-doped silicon dioxide glass and methods of manufacturing thereof is described having a lowered electrical resistivity and increased conductivity. Conventional techniques for carbon-doping $SiO_2$ are often limited to thin film materials. The present disclosure describes low-cost, solution-based methods for producing carbon-doped bulk $SiO_2$ glass as a promising means for developing silica-based specialty glass and fibers, optical fibers, optical attenuators, fiber lasers, or sensors. Carbon dopant distribution is uniform within the $SiO_2$ bulk layer which leads to improved electrical and optical properties.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A silica-based substrate comprising:
    a glass phase;
    a dispersed phase comprising carbon,
    wherein the silica-based substrate has a thickness of at least 10 μm, and the carbon is a nanostructure comprising at least one of nanoparticles, nanorods, nanowires, nanocylinders, or nanoribbons.

2. The substrate of claim 1, wherein the electrical resistivity is in a range of 3000 $\Omega \cdot cm$ to 5000 $\Omega \cdot cm$.

3. An optical fiber, optical attenuator, fiber laser, or sensor comprising the substrate of claim 1.

4. A method of forming a silica-based substrate, the method comprising:
    contacting a porous silica soot preform with an organic solution comprising at least one hydrocarbon precursor to form a doped silica soot preform;
    heating the doped silica soot preform in an inert atmosphere to form the silica-based substrate,
    wherein the hydrocarbon precursor comprises at least one of:
    (a) alkanes of the form $C_nH_{2n+2}$;
    (b) alkenes of the form $C_nH_{2n}$;
    (c) carboxylic acids, amines, or alcohols with an aliphatic group of at least 6 carbon atoms;
    (d) metal carboxylates;
    (e) graphite powder; amorphous carbon powder; paraffin wax; or phenolic resin; or
    (f) organic polymers;
    wherein n>6.

5. The method of claim 4, wherein the porous silica soot preform has a porosity in a range of 25% to 75% and pore sizes in a range of 100 nm to 500 nm.

6. The method of claim 5, wherein the porosity is in a range of 55% to 65% and pore sizes in a range of 100 nm to 300 nm.

7. The method of claim 4, wherein the hydrocarbon precursor comprises at least one of: icosane, octadecane, heptadecane, 1-octadecene, stearic acid, oleic acid, myristic acid, octanoic acid, oleylamine, trioctylamine, octadecenol, zinc stearate, zinc oleate, zinc acetate, polystyrene, or polyethylene.

8. The method of claim 4, wherein the organic solution comprises at least one of: hexane, heptane, toluene, benzene, acetone, methanol, ethanol, butanol, chloroform, dichloromethane, or water.

9. The method of claim 4, wherein the organic solution comprises at least one of zinc stearate and toluene or stearic acid and hexane.

10. The method of claim 4, wherein the step of contacting is conducted at or above a boiling point temperature of the organic solution.

11. The method of claim 4, wherein after the step of contacting,
cooling the doped silica soot preform; and
drying the doped silica soot preform in air.

12. The method of claim 4, wherein the organic solution has a concentration of the at least one hydrocarbon precursor in a range of 1 mg/mL to 100 mg/mL.

13. The method of claim 4, wherein the step of heating is conducted at a temperature in a range of 1000° C. to 2000° C. and for a time in a range of 0.1 hr to 10 hrs.

14. The method of claim 4, wherein the step of heating comprises:
decomposing the at least one hydrocarbon precursor into an amorphous carbon; and
densifying the doped silica soot preform to form the silica-based substrate.

15. The method of claim 13, wherein the temperature is in a range of 1300° C. to 1500° C. the time is in a range of 1 hr to 3 hrs.

16. The method of claim 4, wherein the silica-based substrate has at least one length dimension less than a length dimension of the silica soot preform.

17. A method of forming a silica-based substrate, the method comprising:
contacting a porous silica soot preform with an organic solution comprising at least one hydrocarbon precursor to form a doped silica soot preform;
heating the doped silica soot preform in an inert atmosphere to form the silica-based substrate,
wherein the heating is conducted at a temperature in a range of 1000° C. to 2000° C. and for a time in a range of 0.1 hr to 10 hrs.

18. The method of claim 17, wherein the temperature is in a range of 1300° C. to 1500° C. the time is in a range of 1 hr to 3 hrs.

19. The method of claim 17, wherein the porous silica soot preform has a porosity in a range of 25% to 75% and pore sizes in a range of 100 nm to 500 nm.

20. The method of claim 18, wherein the organic solution has a concentration of the at least one hydrocarbon precursor in a range of 1 mg/mL to 100 mg/mL.

* * * * *

UNITED STATES PATENT AND TRADEMARK OFFICE
CERTIFICATE OF CORRECTION

PATENT NO. : 11,919,805 B2
APPLICATION NO. : 15/734078
DATED : March 5, 2024
INVENTOR(S) : Yunfeng Gu et al.

It is certified that error appears in the above-identified patent and that said Letters Patent is hereby corrected as shown below:

On the Title Page

In item (57), in Column 2, in "Abstract", Line 3, delete "gm." and insert -- µm. --.

On page 2, in Column 2, under "Other Publications", Line 5, delete "3557," and insert -- 357, --.

On page 2, in Column 2, under "Other Publications", Line 17, delete "Liminescent" and insert -- Luminescent --.

In the Specification

In Column 1, Line 11, delete "62/679,209" and insert -- 62/679,209, --.

In Column 1, Line 12, delete "2018" and insert -- 2018, --.

Signed and Sealed this
Second Day of July, 2024

Katherine Kelly Vidal
*Director of the United States Patent and Trademark Office*